United States Patent [19]

Lobash et al.

[11] Patent Number: 5,031,496
[45] Date of Patent: Jul. 16, 1991

[54] APPARATUS AND METHOD UTILIZING A WATER JET FOR CUTTING FROZEN FISH SLABS INTO A PLURALITY OF INDIVIDUAL PORTIONS

[75] Inventors: Floyd Lobash, Minneapolis; John T. Lyons, Mound; Clifton H. Morrison, St. Paul; Stanley C. Rustad, Waconia, all of Minn.

[73] Assignee: General Mills, Inc., Minneapolis, Minn.

[21] Appl. No.: 524,111

[22] Filed: May 16, 1990

[51] Int. Cl.$^5$ .................. A22C 25/18; B26D 5/22; B26F 3/00
[52] U.S. Cl. .................. 83/107; 83/177; 83/423; 83/425.3; 83/428; 83/435.2; 83/565; 83/102
[58] Field of Search .................. 83/177, 26, 27, 411.3, 83/411.5; 428, 434, 435.2, 565, 107, 734, 102, 425, 425.2, 425.3, 425.4, 423, 53

[56] References Cited

U.S. PATENT DOCUMENTS

| | | | |
|---|---|---|---|
| 3,089,526 | 5/1963 | Lykkeberg | 83/423 |
| 3,427,910 | 2/1969 | Zempel | 83/107 |
| 3,491,634 | 1/1970 | Tomshany | 83/105 X |
| 4,213,360 | 7/1980 | Hartmann | 83/15 |
| 4,246,838 | 1/1981 | Pulver et al. | 83/177 X |
| 4,299,150 | 11/1981 | Husten et al. | 83/113 X |
| 4,847,954 | 7/1989 | Lapyre et al. | 83/177 X |
| 4,875,254 | 10/1989 | Rudy et al. | 83/177 X |
| 4,922,775 | 5/1990 | Winter | 83/428 X |
| 4,941,379 | 7/1990 | Gasbarro | 83/409.2 |

Primary Examiner—Frank T. Yost
Assistant Examiner—Kenneth E. Peterson
Attorney, Agent, or Firm—L. MeRoy Lillehaugen; John A. O'Toole; Stuart R. Peterson

[57] ABSTRACT

Frozen slabs of fish are introduced one at a time to one end of a conveyor having a bed of laterally spaced plastic strips forming slots therebetween. Beneath each slot is an endless chain having a series of upwardly directed fingers thereon. The fingers are engagable with the various slabs so as to advance the slabs to a location beneath an assembly of water jet devices, each device including a pivotal arm having a nozzle at one end thereof. A barrel cam has a plurality of tracking grooves, the pivotal arms having cam followers depending downwardly therefrom into the tracking grooves of the barrel cam. As the slabs are successively advanced beneath the liquid jet devices, the jets cut the particular slab into individual portions. Advancement of the now severed portions cause the portions to be moved onto a plurality of tilt strips which prevent the cut edges from freezing together. The individual portions are then delivered onto a spreader conveyor assembly comprised of three angularly oriented sets of rollers, two of the sets flanking the first or central set and causing the individual portions to traverse a diverging path for subsequent processing.

11 Claims, 11 Drawing Sheets

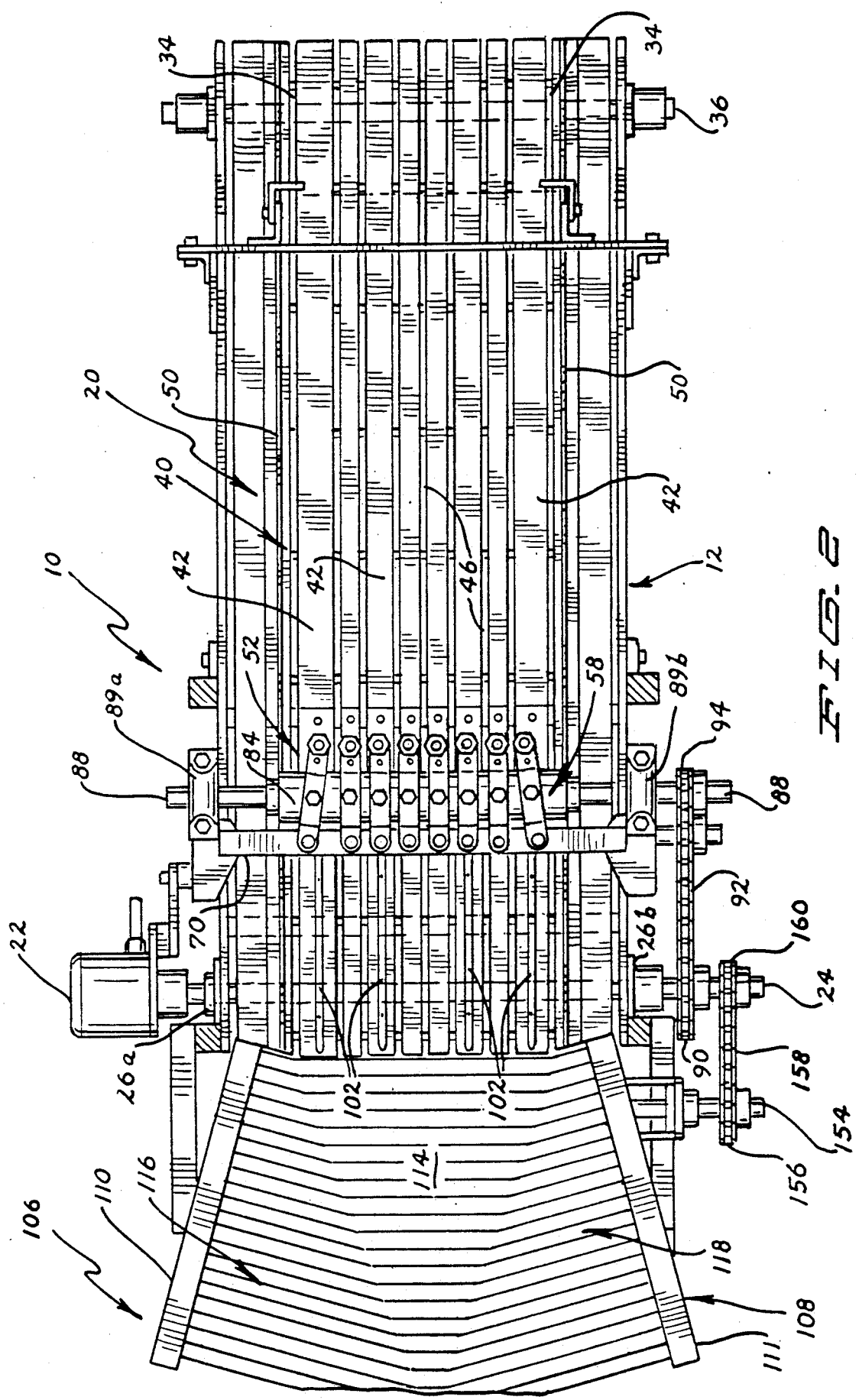

APPARATUS AND METHOD UTILIZING A WATER JET FOR CUTTING FROZEN FISH SLABS INTO A PLURALITY OF INDIVIDUAL PORTIONS

BACKGROUND OF THE INVENTION

1. Field of the Invention

This invention relates generally to the cutting of frozen food slabs, and pertains more particularly to the cutting of a slab of frozen fish into individual portions having a desired configuration, such as portions possessing either a curved or rectangular outline.

2. Description of the Prior Art

As pointed out in U.S. Pat. No. 4,299,150, issued on Nov. 10, 1981 to Huston et al, entitled "METHOD AND APPARATUS FOR SEVERING PORTIONS FROM A PLURALITY OF FROZEN COLUMNS OF FISH OR THE LIKE," such patent having been assigned to the same assignee as the present application, it is highly desirable to minimize the formation of "sawdust" which reduces the number of portions obtainable from a column or log of frozen fish. While the apparatus described and claimed in said patent has performed admirably in actual practice, the resulting portions that are cut have straight edges, although the cross section of such rectangular portions can be varied in size. The straight edges produce portions lacking a more natural appearance, and are not as aesthetically attractive as portions having a degree of curvature imparted thereto.

It is recognized that fish portions have been produced via a stamping technique to press out portions possessing an irregular shape. However, a stamping action causes an objectionable number of the resulting portions to be broken.

SUMMARY OF THE INVENTION

Accordingly, an important object of the present invention is to cut or sever from a frozen slab of food, namely, a frozen slab of fish, that can be cut in a manner to produce an outline having a desired amount of curvature, thereby enhancing the appeal of such portions to purchasers of breaded frozen fish portions. However, the invention is capable of producing portions with only straight edges when such shapes are desired. Thus, an aim of our invention is to provide frozen food portions having various shapes.

Another object of the invention, while realizing various shaped portions, is to avoid the use of knives that can cause a significant amount of portion breakage, especially when the knife advances at a slant and the sides of the frozen block (or blocks) are constrained from moving during the knife progression. Thus, it is within the purview of the prevent invention to sever or cut portions from a frozen fish slab that can be accomplished economically and yet have the cut portions possess such an attractive appearance that the marketing of such irregularly shaped portions possesses a greater point-of-sale appeal. In this regard, the actual shape of the various individual portions when practicing our invention can be pictured on the wrapper of a frozen fish package, thereby in many instances inducing the purchase of such a package rather than a package picturing frozen fish portions having only straight edges.

Yet another object is to prevent the freezing together of the portions after they have been individually severed from the frozen fish slab. In this regard, it is planned that the use of water jets be employed to sever the portions from the frozen fish slab, yet prevent the severed portions from freezing together.

Another object of the invention is to provide an apparatus and method for providing individual portions having irregularly curved edges that can be mass produced, that is, produced in a continuous manner. All that need be done is to provide a stack of frozen fish slabs and successively advance the slabs beneath a desired number of programmably shiftable water jets which perform the cutting action, resulting in a number of individual portions having a desired shape imparted thereto, and then advancing the individual portions in a separated manner for subsequent breading and battering.

Briefly, our invention comprises a magazine at one end of the apparatus that gravitationally lowers the various frozen fish slabs onto a bed comprised of a number of plastic strips having slots therebetween via which move a series of advancing fingers projecting upwardly from a continuous chain, there being a chain and a series of fingers for each slot. The fingers advance the slabs in a horizontal direction to a location beneath a cutting station where a number of water jet devices are situated, each water jet device being pivotally mounted and laterally shifted by a barrel or cylinder cam having track grooves disposed therein so that each jet is moved in accordance with a desired pattern or program dictated by the particular groove that controls the movement of the jet device mounted thereabove.

After leaving the cutting station, the fingers continue to advance the severed portions, doing so over a plurality of tilt strips or ribs that slightly angle the individual portions so as to separate somewhat the edges that would otherwise be prone to freezing together. After leaving the tilt strips or ribs, the portions are moved onto a spreader conveyor assembly composed of a number of angularly oriented rollers that continue to advance the cut portions, but doing so in a manner that the portions are advanced in a diverging relationship. The spreader conveyor assembly assures that the portions are separated sufficiently for appropriate delivery to a food processing station where the portions are conventionally breaded and battered prior to packaging.

BRIEF DESCRIPTION OF THE DRAWINGS

FIG. 1 is a side elevational view of apparatus exemplifying our invention;

FIG. 11 is an enlarged fragmentary view taken in the direction of line 11—11 in FIG. 5 for the purpose of showing to better advantage the manner in which one of the flexible water tubes is mounted on the pivotal arm of one of the water jet devices.

DESCRIPTION OF THE PREFERRED EMBODIMENT

Figure 6:
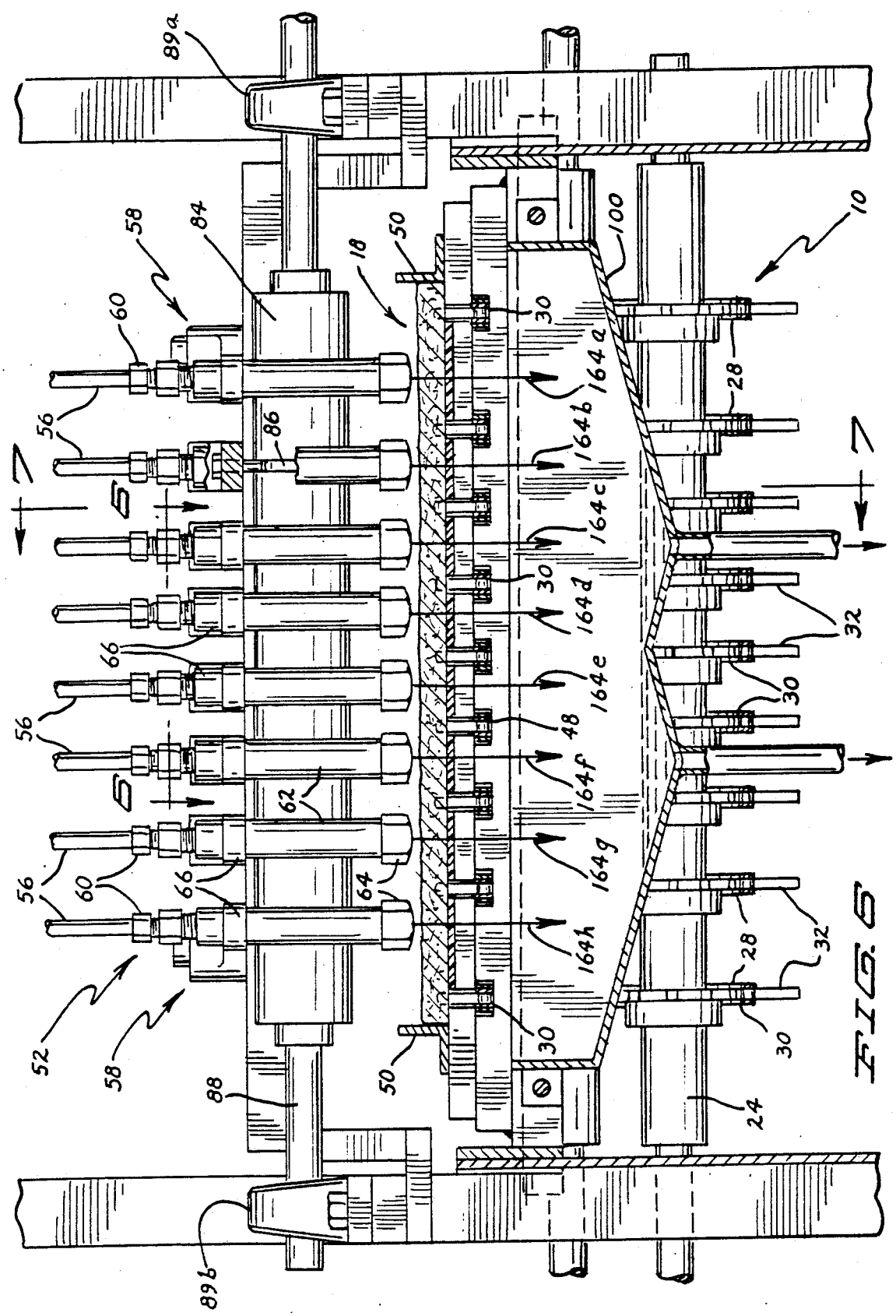
FIG. 6 is a transverse sectional view taken in the direction of line 6—6 of FIG. 5.

Referring now in detail to the drawings, the apparatus illustrating our invention has been indicated generally by the reference numeral 10. The apparatus includes a main conveyor frame 12 having a plurality of supporting legs 14 Supported at the right on the frame 12 in FIG. 1 is a slab magazine denoted generally by the reference numeral 16. All that need be understood is that the magazine 16 contains therein a plurality of vertically stacked frozen fish slabs 18, not visible in FIG. 1 but appearing individually in FIGS. 6, 7, and 8. In practice, the frozen fish slabs are rectangular in shape and more specifically have a width of 2.5 inches, a length (extending transversely in the magazine 16) of 19 inches and a height or thickness of 0.375 inch. Obviously, the dimensions are susceptible to variation, but are typical of slabs that result in the individually severed portions (which portions will be referred to in greater detail hereinafter).

Whereas the conveyor frame has been identified by the reference numeral 12, it can now be pointed out that the frame 12 is part of a main conveyor 20. In this regard, there is a hydraulic motor 22 having a drive shaft 24 supported in bearings 26a and 26b. On the drive shaft 24 are eight cogs 28 (best seen in FIG. 6), each having a roller chain 30 in mesh therewith. Each roller chain 30, and there are eight such chains in the exemplified situation, have a series of slab-advancing fingers 32 carried thereon. The eight roller chains 30 also are in mesh with eight cogs 34 on a driven shaft 36, the lateral spacing of the cogs 34 corresponding to that of the cogs 28.

Figure 7:
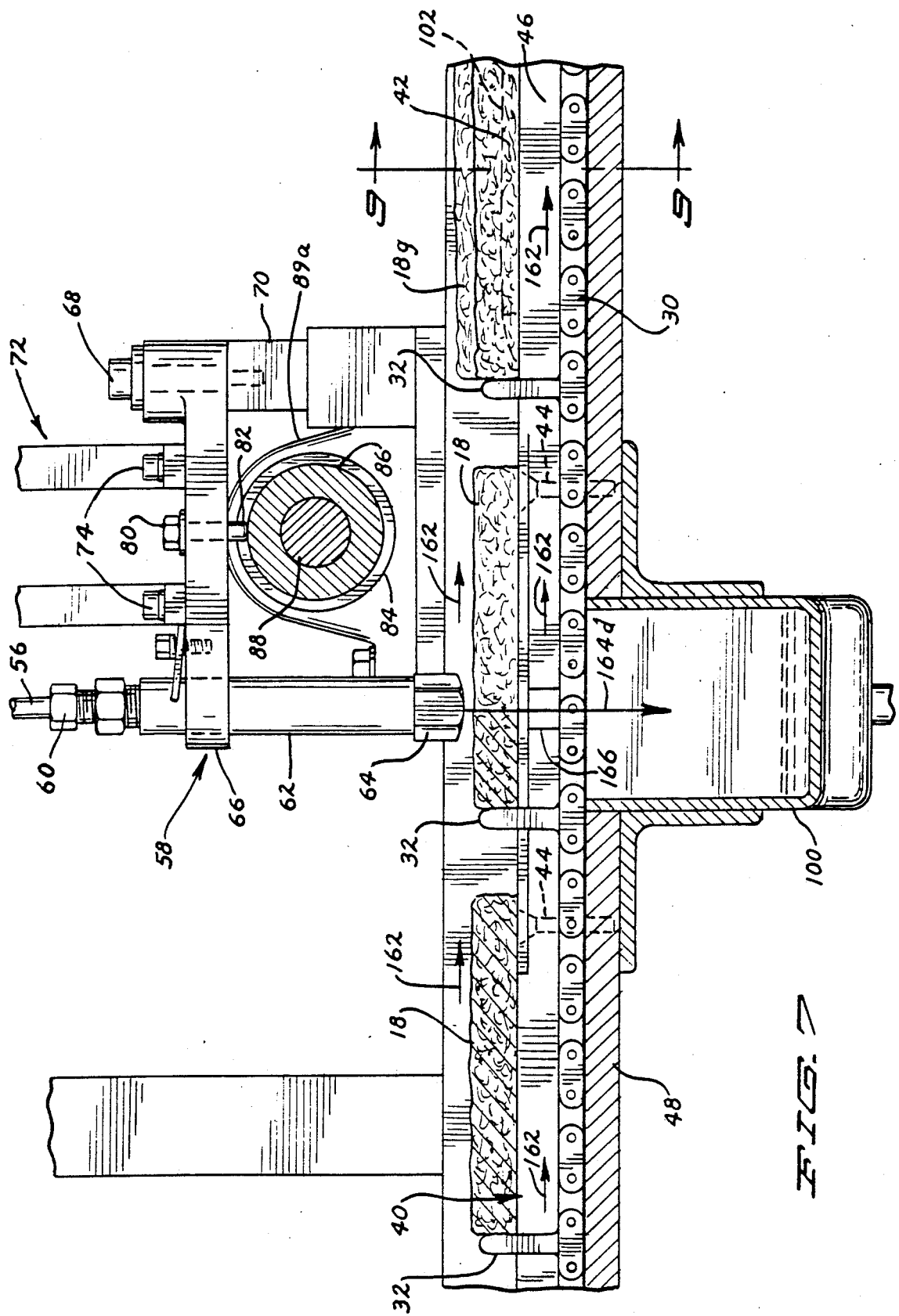
FIG. 7 is an enlarged sectional view taken in the direction of line 7—7 of FIG. 6.

The conveyor 20 includes a slab bed 40 comprised of a plurality of plastic strips 42, the strips 42 being held in place by flathead screws 44 (see FIG. 7). It is to be noted that the plastic strips 42 are spaced to form slots 46 via which the fingers 32 move in advancing the slabs 18 received from the lower end of the magazine 16. Beneath the bed 40, that is, under the plastic strips 42, is a grooved chain plate 48 (see FIGS. 7 and 9), actually composed of a number of individual plates, the function of which is to support the various chains 30 so that the slab-advancing fingers 32 project upwardly above the surface of the strips 42, the degree of upward projection being sufficient to enable the fingers 32 to engage and advance the various slabs 18. The slabs 18 are advanced by the fingers 32 between the side guides 50, the guides 50 actually constituting angle members that are spaced laterally from each other, the spacing corresponding to the length of the slabs which length has been mentioned as being 19 inches.

Figure 3:
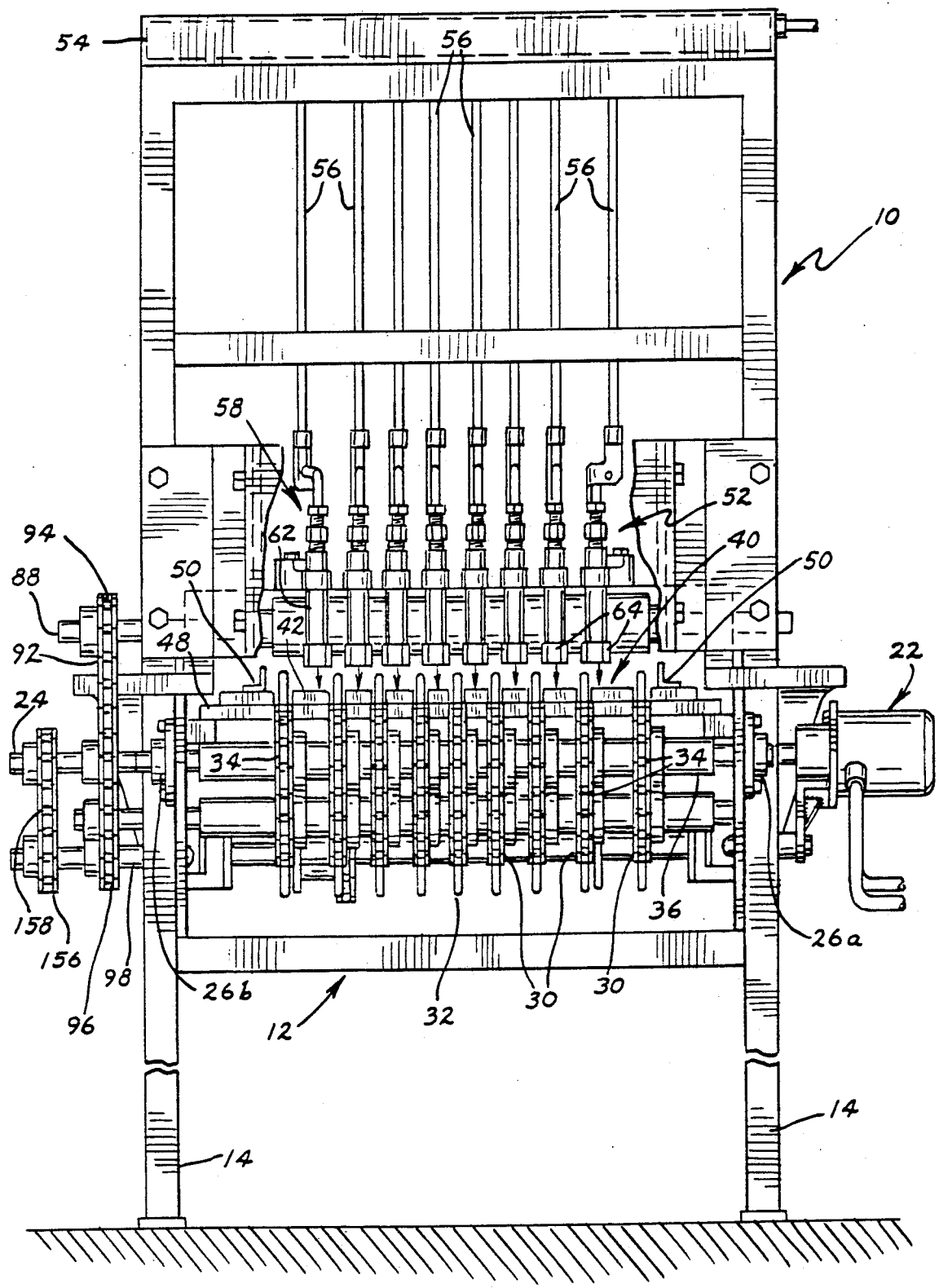
FIG. 3 is an end elevational view taken from the right in FIG. 1.

Playing an important role in the practicing of our invention is a water jet assembly or station 52 which includes a water supply manifold 54 (FIGS. 1, 3 and 4) having a plurality of flexible supply tubes 56, actually eight such tubes, extending downwardly therefrom. The tubes 56 are connected to eight water pistols or jet devices 58 by means of a fitting or coupling 60. The pistols or jet devices 58 each include a cylindrical barrel 62 having a nozzle 64 at its lower end.

Each barrel 62 is mounted on a pivotal arm 66, there being a pivot pin 68 that permits the arm 66 (and the barrel 62 together with its nozzle 64) to be swung in a horizontal plane. There is an arm bridge 70 extending transversely that supports the various pivot pins 68. The manner in which the arms 66 are pivoted will be explained shortly.

At this time, attention is directed to a bracket 72 (best seen in FIG. 11), there being a bracket 72 for each pivotal arm 66. Actually, the lower end of each bracket 72, and in the illustrated situation there are eight such brackets, is fastened to the pivotal arm 66 with which it is associated by bolts 74. The various flexible supply tubes 56 are clamped in each instance at 76 by means of bolts 78. It will be appreciated that the supply tubes 56, as already mentioned, are coupled to the various barrels 62 and by clamping the tubes 56 through the agency of the brackets 72, twisting motion between the lower ends of the tubes 56 and the various fittings 60 is prevented. Without this feature, any angular or twisting movement of the lower ends of the tubes 56 (where they are attached to the fittings 60) would cause them to loosen and allow water to escape. It will be appreciated that the manifold 54 is connected to an intensifier pump (not shown) which increases the municipal water supply pressure of approximately 90 pounds per square inch to a sufficiently high pressure for performing the cutting operation, in practice on the order of 50,000 pounds per square inch.

One of the salient features of our invention is the capability of cutting the slabs 18 into curved and irregular contoured portions, thereby providing a more natural appearance so as to enhance the sales appeal of the frozen fish product when sold in grocery stores and supermarkets. To swing the pivotal arms 66, and hence the pistols or jet devices 58 so as to effect desired cutting patterns, each pivotal arm 66 is provided with a cam follower 80 having a downwardly projecting dowel pin 82. By reason of a barrel or cylinder cam 84 formed with tracking grooves 86 into which the dowel pins 82 extend, the various pistols or devices 58, more specifically their nozzles 64, are moved from side to side as the slabs 18 pass therebeneath so as to provide the specific configuration for the portions that are being severed.

The barrel cam 84 is mounted on a camshaft 88 journaled in bearings 89a and 89b. By means of a drive cog 90 (best seen in FIGS. 1-5 and 10) on the previously mentioned drive shaft 24, a roller chain 92, a driven cog 94 on the cam shaft 88, an idler cog 96 and an idler shaft 98, the barrel cam 84 is rotated in a prescribed relationship with the rate of advancement of the slabs 18. It will be recalled that the cogs 28, being carried on the drive shaft 24, cause the roller chains 30 to move at a prescribed rate determined by the hydraulic motor 22. Since the cam 84 is driven in a synchronized relation with the chains 30, the pistols or water devices 58, depending upon the angulation of the tracking grooves 86, will cut the various slabs 18 in accordance with the pattern or program provided by the tracking grooves 88. This will become better understood as the description progresses.

At this time, attention is directed to a catch basin 100 (FIGS. 6 and 7) that collects the water from the various devices 58 after their water jets have cut through the various slabs 18 that are progressively fed to the water jet assembly or station 52.

Figure 9:
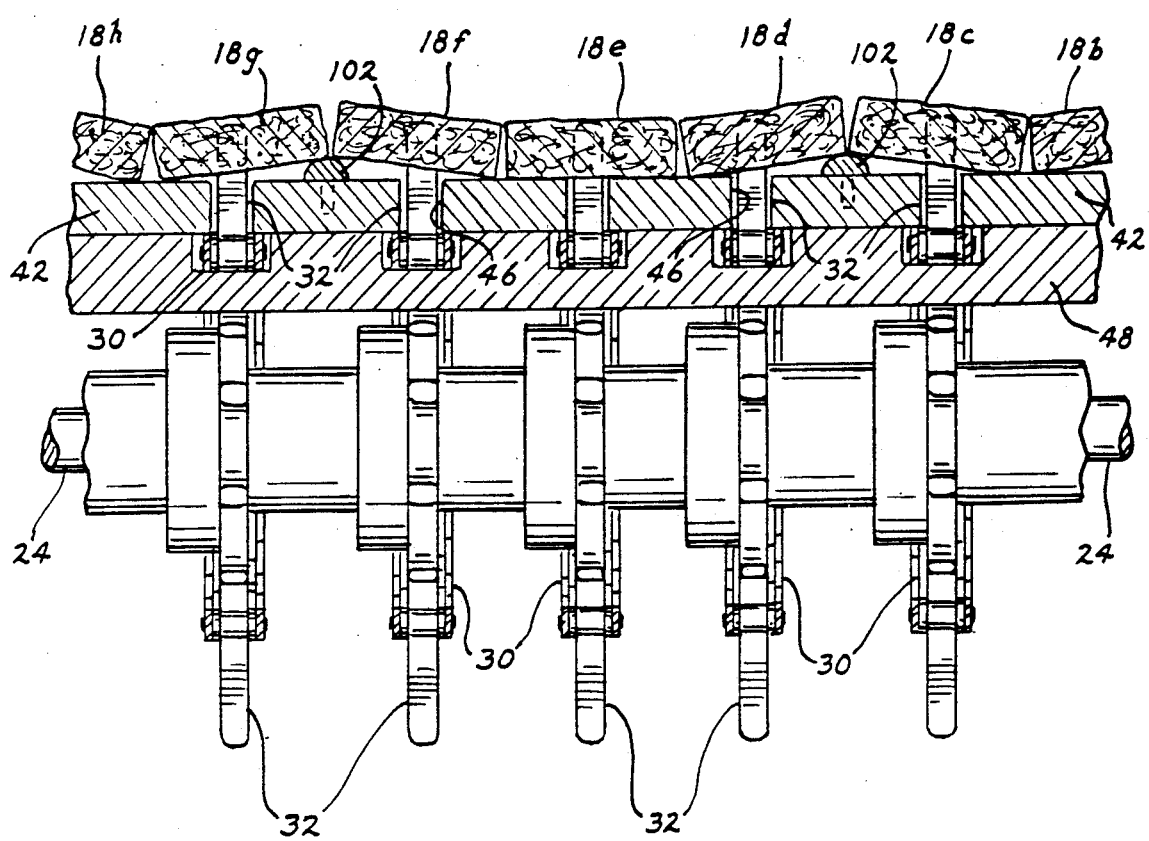
FIG. 9 is a sectional view taken in the direction of line 9—9 of FIGS. 7 and 8.

After a slab 18 has been severed or cut into individual portions 18a–18i, it is important not to have the portions refreeze. To prevent this from occurring, a plurality (actually four) of tilt strips or ribs 102 provide slightly raised surfaces that simply tilt the various individual portions so that their edges do not freeze together. The two tilt strips or ribs appearing in FIG. 9 are believed sufficient to illustrate the tilting action that is obtained.

While the tilt strips or ribs 102 prevent a refreezing of the cut portions, a spreader conveyor assembly 106 is instrumental in sufficiently separating or spreading apart the individual portions prior to going through the battering and breading application. In other words, it is very important that the cut portions advance as individual portions after leaving the water jet assembly or station 52 so that all faces and edges are coated with batter. The spreader conveyor assembly 106 includes a support frame 108 that extends actually from the main frame 12. The support frame 108 includes angularly oriented vertical side plates 110 and 111, and centrally located vertical plates 112 and 113 (see FIG. 4).

Figure 2:
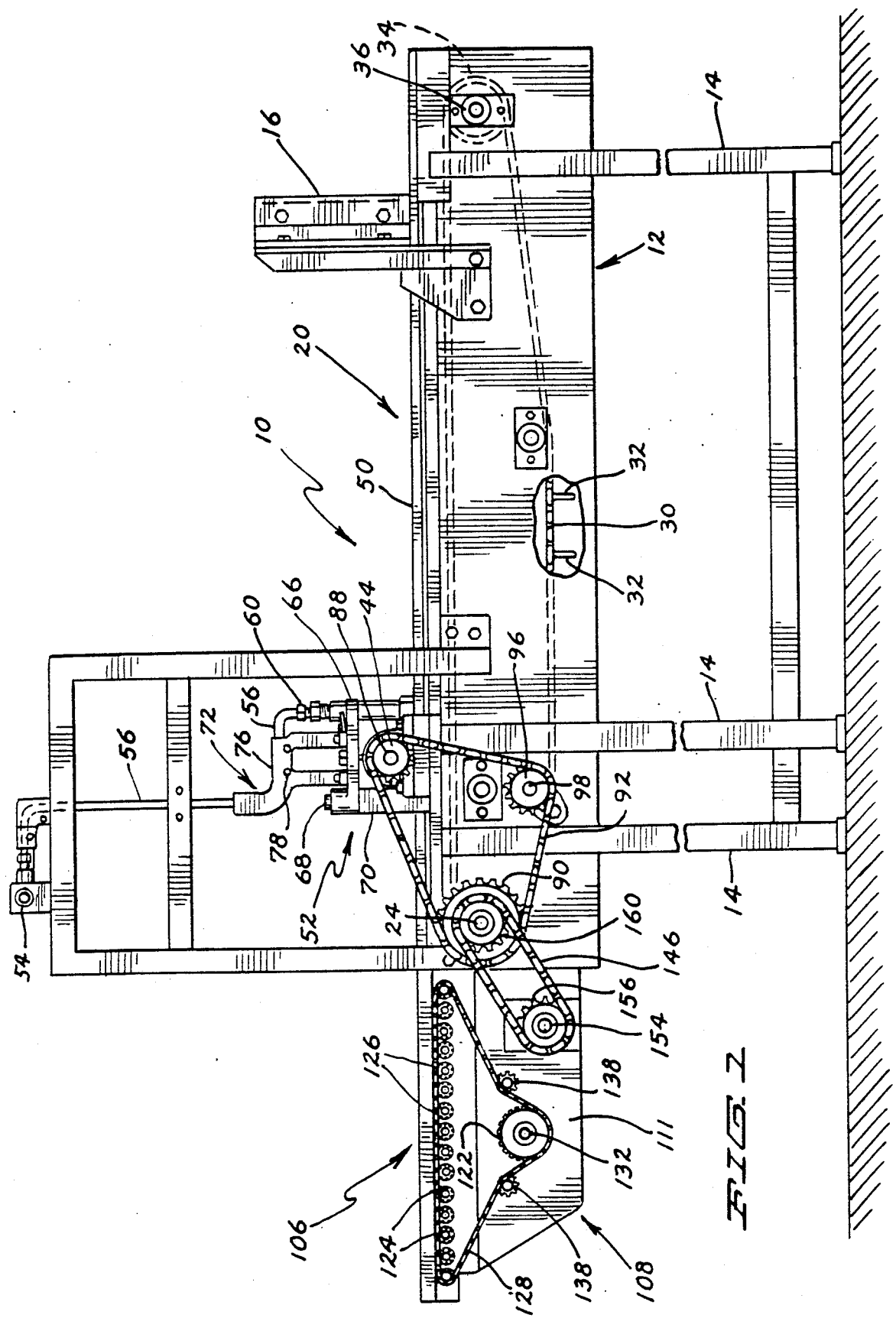
FIG. 2 is a top plan view of the apparatus shown in FIG. 1.
Figure 10:
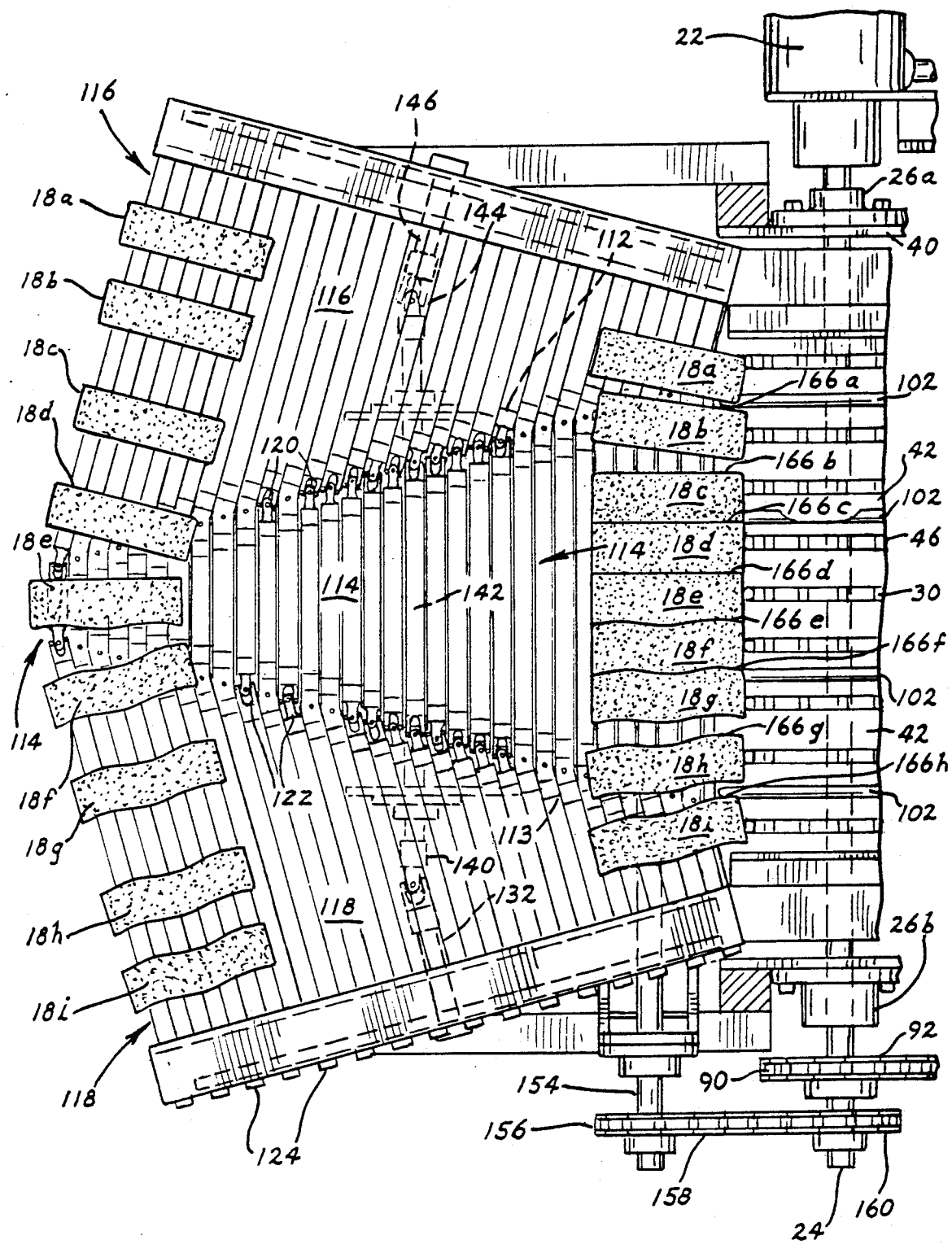
FIG. 10 is a top plan view of the spreader conveyor assembly, together with an end portion of the conveyor for advancing the cut fish portions.
Figure 22:
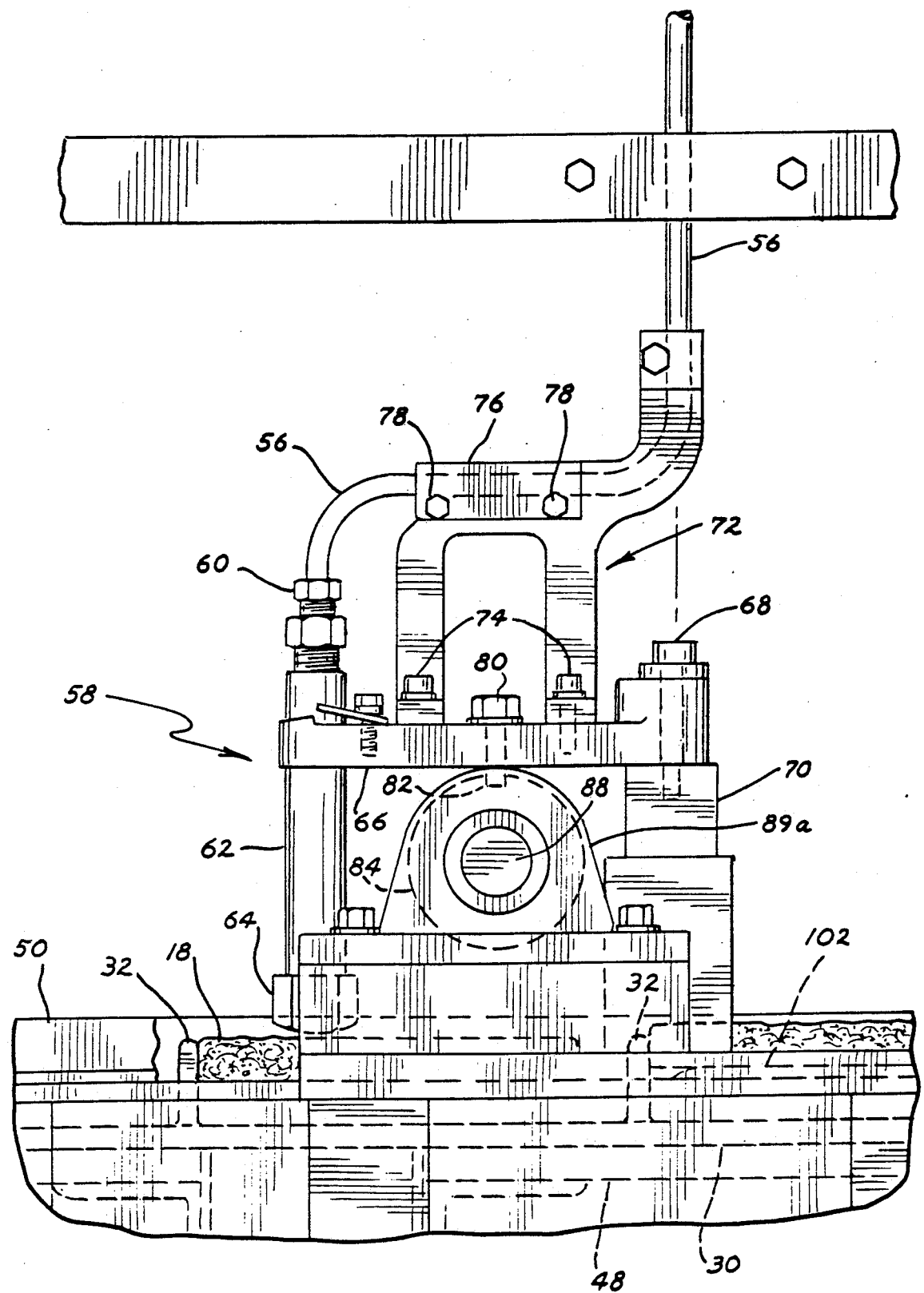

The spreader conveyor assembly 106 includes a central set of horizontally arranged rollers 114 that become progressively shorter, as can readily be seen from FIGS. 2 and 10, especially FIG. 10. Flanking the central set of rollers 114 are additional sets of rollers 116 and 118 which become progressively longer in the direction of movement of the various portions after being cut at the water jet station 52. From FIG. 9 it will be seen that the central rollers 114 are connected to the rollers 116 by universal joints 120 and similarly the other ends of the rollers 114 are connected to the rollers 118 by universal joints 122. Each roller 118 has a stub shaft 124 projecting therefrom. On each of the stub shafts 124 is a small pinion gear or cog 126. Entrained about the various small cogs 126 is a roller chain 128 (see FIG. 1 where the chain is only diagrammatically illustrated), the roller chain 128 also passing about a large cog 130 on a shaft 132. In addition, there are idler cogs 138. In other words, the chain extends around all of the cogs 126, 130 and 138.

Figure 4:
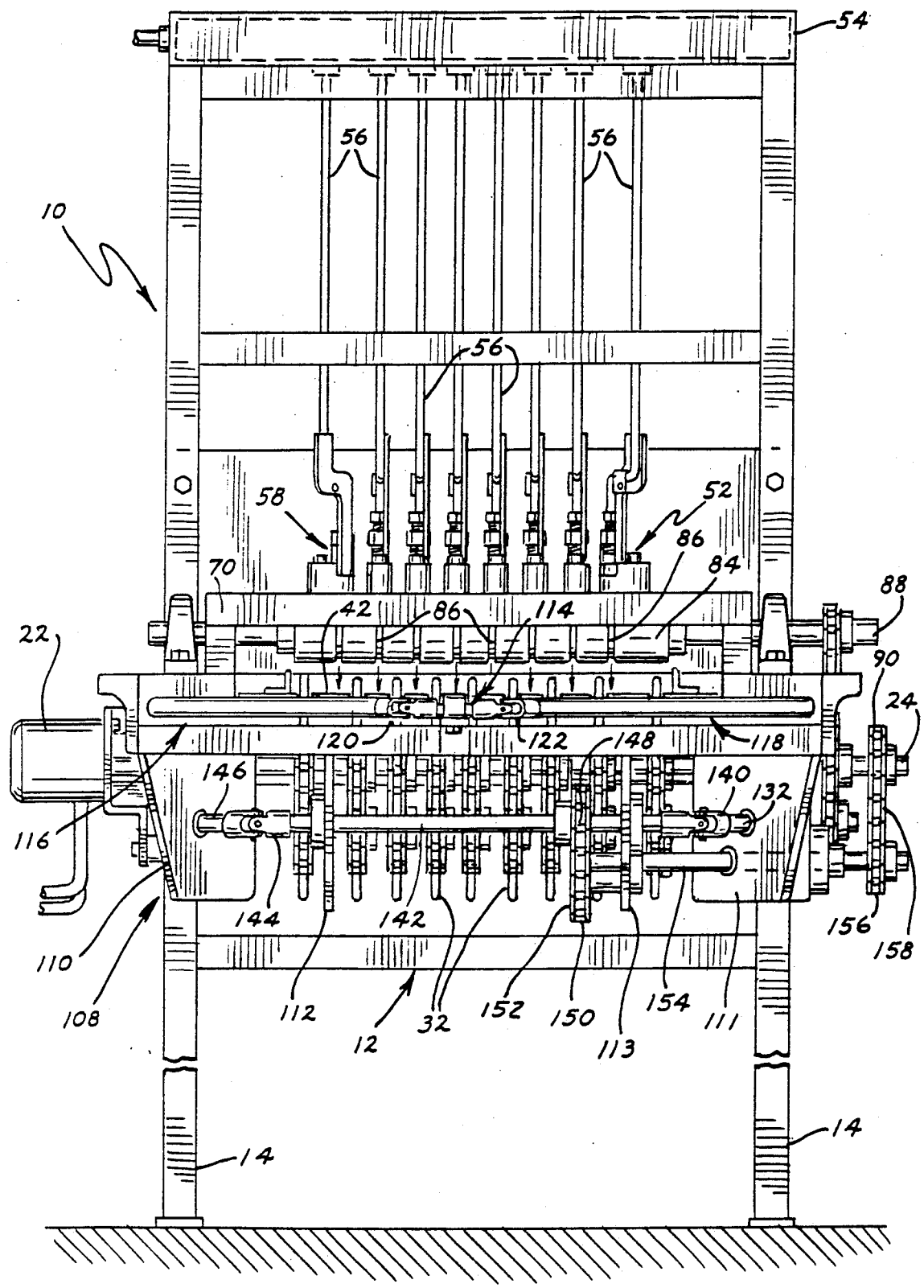
FIG. 4 is an end elevational view taken from the left in FIG. 1.
Figure 5:
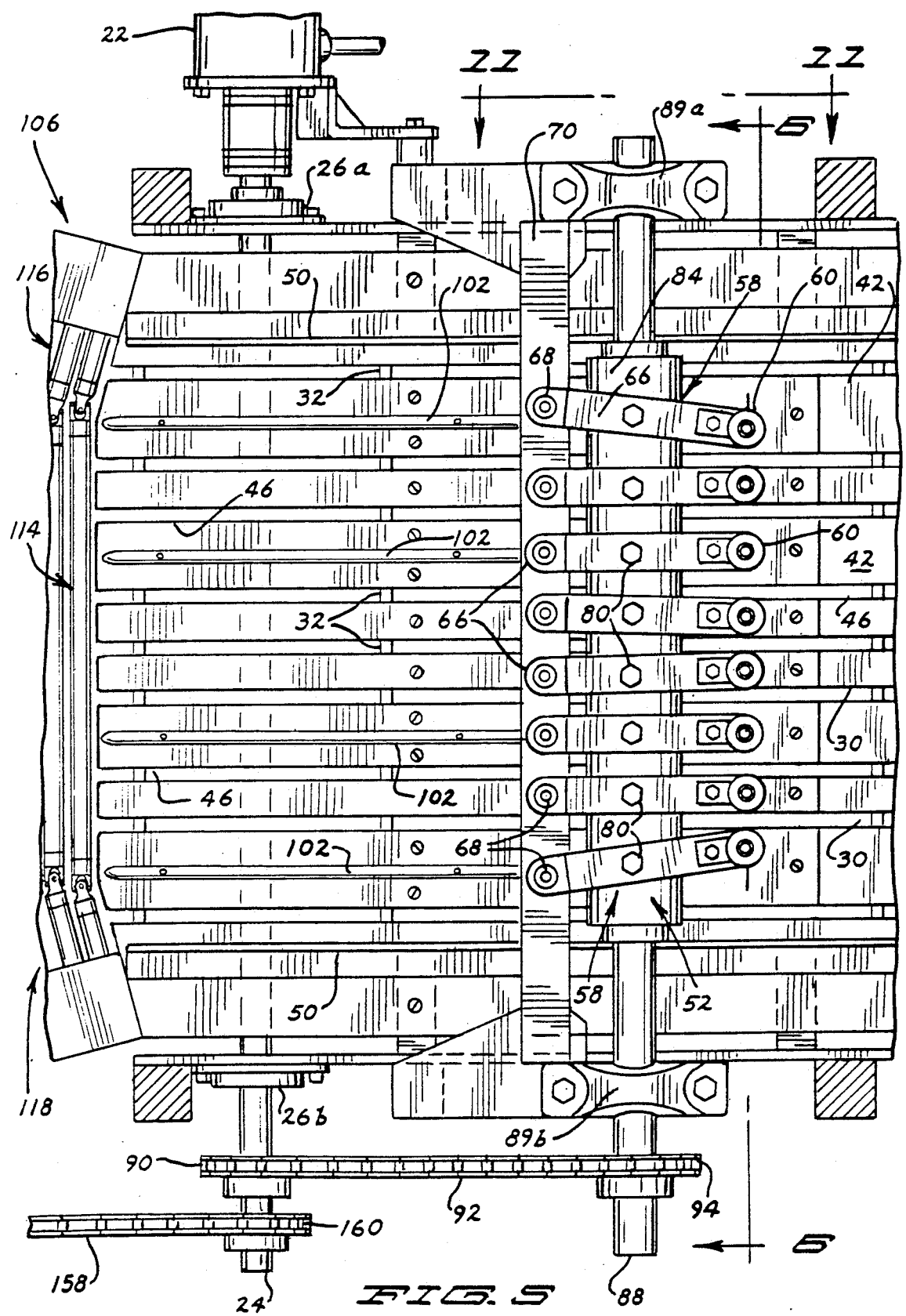
FIG. 5 is an enlarged fragmentary plan view of the cutting station, a portion of the conveyor feeding the slabs to the cutting station, and a portion of the conveyor between the cutting station and the spreader conveyor assembly, only a portion of the spreader conveyor assembly being illustrated.

As can be seen in FIG. 4, the shaft 124 is connected by way of a universal joint 140 to a central shaft 142, the other end of the shaft 142 being connected by way of a universal joint 144 to a shaft 146 corresponding to the shaft 132, although the shaft 146 is devoid of a cog similar to the cog 130.

As can also be seen in FIG. 4, the central shaft 142 has a cog 148 thereon about which passes a chain 150. There is a cog 152 on a shaft 154. There is also a cog 156 on the shaft 154, and by means of a chain 158 entrained about the cog 156 and a cog 160 on the drive shaft 24, the various rollers 114, 116 and 118 are driven so as to advance the cut portions 18a–18i to the left as viewed in FIG. 1 although exemplaryly cut portions 18a–18i do not appear in FIG. 1, they do, however, appear in FIG. 10 and some in FIG. 9. At the same time, because of the divergence of the sets of rollers 116 and 118 relative to the set 114, the cut fish portions 18a–18i are further separated.

Although the operation of our apparatus 10 should be readily understood from the description that has been presented, it will help in appreciating the full benefits to be derived from our invention to indicate that the slabs 18, after they have been discharged from the lower end of the magazine 16 onto the bed 40 of the conveyor 20, advance in the direction of the arrows 162 to a location beneath the water jet assembly 52. It will be helpful to show, even though schematically, the various water jets that perform the cutting action. Therefore, from FIG. 6 it will be seen that the water jets have been labeled 164a–164h. Actually, the cutting action is perhaps best understood by referring to FIG. 7 where the jet 164d appears, the jet 164d extending downwardly through a transverse slot 166 formed in the particular plastic strip 42 that is underlying the slab 18 that is passing thereover. Inasmuch as there are eight water jets 164a–164h, it follows that there are eight cuts 166a–166h, all of these cuts being indicated generally in the slab 18 shown in FIG. 10, although the cuts 166c–166f appear in FIG. 8. From FIG. 8, it will be discerned that the cuts 166c and 166d appearing in this figure have been deliberately made parallel to each other owing to the configuration of the tracking grooves shown in FIG. 8 (and also to illustrate to some degree the variety of cuts that can be made), whereas the cuts 166e and 166f have been given a curved appearance (to also indicate the variety of cuts) derived from the curved cam tracks. All that need be appreciated is that the barrel cam 84 is formed with appropriately configured tracking grooves 86, the grooves 86 forming severed or individual portions 18a–18i in that the eight devices 58 produce the eight cuts 166a–166h to provide the nine individual portions 18a–18i.

Immediately after a slab 18 is cut into the portions 18a–18i, the four tilt strips 102 elevate those adjacent ends of the portions 18a–18i riding or overlying the strips 102 so as to prevent all of their adjacent edges from freezing together. Of course, the various fingers 32 continue to act against the severed portions 18a–18i, causing these portions 18a–18i to continue to ride or slide over the tilt strips 102.

It is important that the cut portions 18a–18i move onto the driven rollers 114, 116 and 118 of the spreader conveyor assembly 106 without pause, thereby both continuing their forward motion and maintaining the space between the advancing groups of cut portions which has been established by the distance between the groups of fingers 32. Once the cut fish portions 18a–18i have been moved onto the spreader conveyor assembly 106, the angulation of the rollers 116 and 118 relative to the roller 114 causes the individual portions 18a–18i to be progressively separated in the crosswise direction, thus providing separation in both directions. This separation, as stated before, is necessary for the next step in the process, which is the application of batter and breading. The foregoing should be readily apparent from the divergence of the rollers 116 and 118 with respect to the rollers 114 Although not shown, it will be understood that it is at the left end of the spreader conveyor assembly 106 when the cut portions 18a–18i are delivered to a processing station where the cut portions are suitably breaded and battered by conventional procedures.

From the preceding description, it can be appreciated that the cutting of the various frozen fish slabs 18 into individual portions 18a–18i can be of a continuous nature. All that the operator need do is to keep introducing slabs 18 into the open upper end of the magazine 16, the slabs 18 gravitationally dropping onto the conveyor 20 in sequence. The various slab-advancing fingers 32 then cause each slab 18 to be moved or advanced to the water jet assembly 52 and the individual portions 18a–18i derived from each slab 18 onto the spreader conveyor assembly 106.

Figure 8:
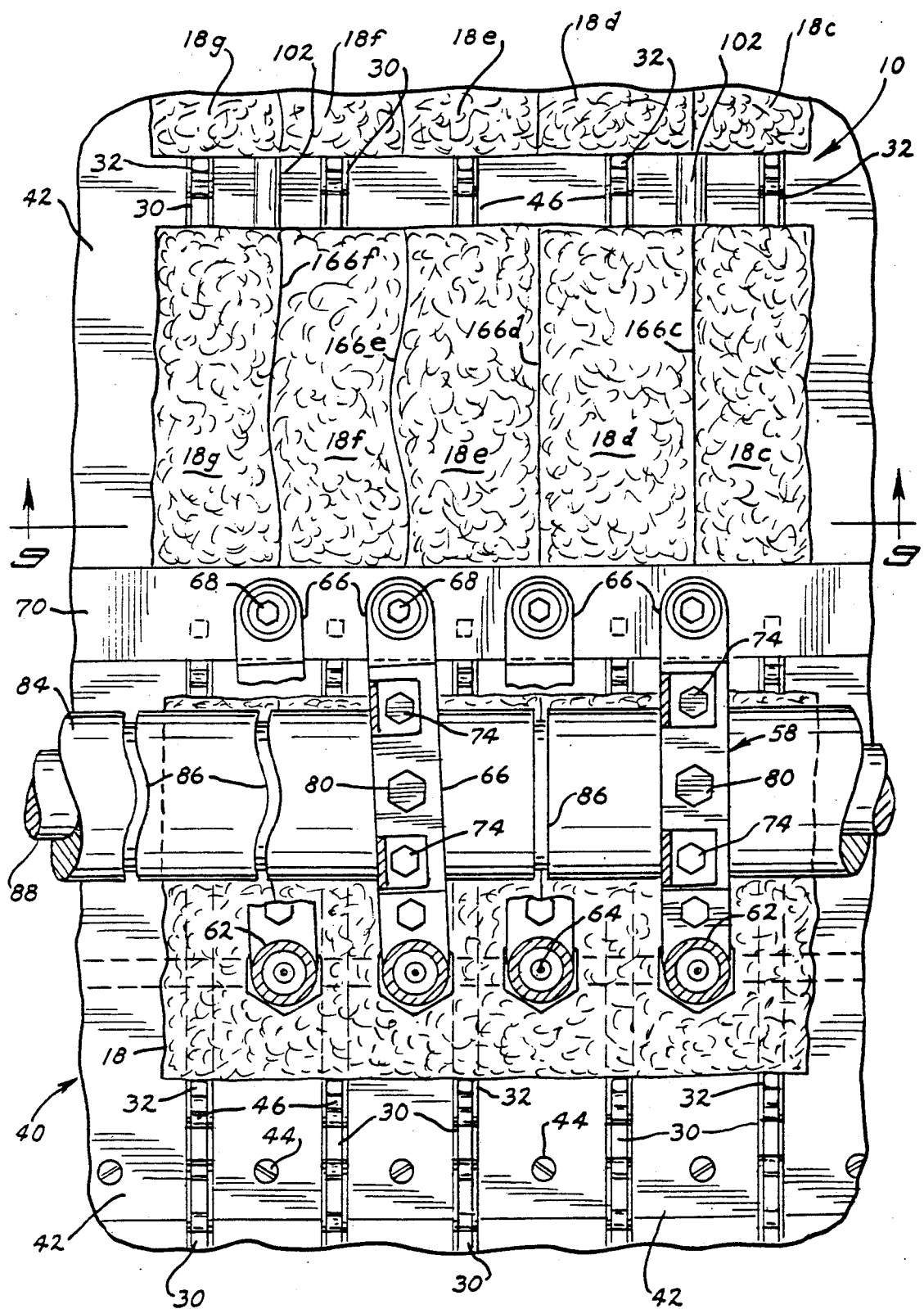
FIG. 8 is an enlarged sectional view taken in the direction of 8—8 of FIG. 6.

It is believed that the cuts appearing in FIG. 8 are sufficiently illustrative of the various patterns that can be derived. It will be understood that the cuts 166c and 166d, as well as other cuts, can be curved so that all of the resulting portions 18a–18i assume irregular configurations possessing a greater amount of consumer appeal than if rectangular. Irregular shapes convey the notion that the individual portions were cut from actual fish and not from blocks. What should be evident is that our invention is quite versatile as far as creating various shapes and configurations, it being possible to not only derive the particular cuts appearing in FIG. 8 (and FIG. 10) but other curved variations as well.

We claim:

1. Apparatus for cutting a frozen food slab into a plurality of individual portions comprising means for advancing a frozen food slab in one horizontal direction, means for directing a liquid jet onto said slab from above as it advances horizontally so as to cut said slab into individual portions having laterally spaced edges, and means for preventing said edges from freezing together after said individual portions have been severed, said means for preventing said edges from freezing together including spreader conveyor means for moving said individual portions away from each other after being severed from said slab, said means for preventing said edges from freezing together also including means intermediate said liquid jet directing means and said spreader conveyor means for tilting said individual portions relative to one another to prevent their said edges from freezing together.

2. Apparatus in accordance with claim 1 in which said advancing means includes a continuous chain having a series of upwardly directed fingers thereon, said fingers being engagable with successive slabs.

3. Apparatus in accordance with claim 2 in which said advancing means includes a pair of laterally spaced plastic strips forming a slot therebetween, said fingers projecting upwardly through said slot to engage successive slabs.

4. Apparatus in accordance with claim 1 in which said means for directing a liquid jet onto said slab includes an arm having opposite ends, said arm being mounted at one of said ends for pivotal movement in a horizontal plane above said slab, and a nozzle at the other of said ends of said arm via which said jet is formed.

5. Apparatus for cutting a frozen fish slab into a plurality of individual portions comprising a main conveyor and including a bed composed of a number of laterally spaced plastic strips forming slots therebetween, said bed having opposite ends, a number of endless chains, each chain being associated with one of said slots and having a series of fingers thereon projecting upwardly through the slot with which it is associated, a magazine at one of said ends of said bed for delivering said slabs successively onto said bed for engagement by said fingers, means for causing said chains to move in a direction to advance said slabs, a number of liquid jet devices located above said main conveyor and intermediate the ends of said bed thereof for cutting said slabs into individual portions, said number of devices corresponding to said number of chains, means for shifting at least some of said devices laterally relative to each other to produce individual portions having curved edges, and a spreader conveyor at the other end of said conveyor for receiving said individual portions and causing said individual portions to be divergingly advanced for a subsequent processing operation.

6. Apparatus in accordance with claim 5 including means between said liquid jet devices and said spreader conveyor for tilting the edges of said individual portions to prevent the freezing together of said curved edges before being delivered to said spreader conveyor.

7. Apparatus in accordance with claim 5 in which each of said devices includes an arm pivotally mounted at one end and a nozzle at its other end, and cam means for pivoting each of said arms.

8. Apparatus in accordance with claim 5 in which said spreader conveyor includes a central set of rollers and two flanking sets of rollers, said flanking sets of rollers diverging away from said central set of rollers.

9. Apparatus for cutting a frozen food slab into a plurality of individual portions comprising means for advancing a frozen food slab in one horizontal direction, means for directing a liquid jet onto said slab from above as it advances horizontally so as to cut said slab into individual portions having laterally spaced edges, said means for directing a liquid jet onto said slab including an arm having opposite ends, said arm being mounted at one of said ends for pivotal movement in a horizontal plane above said slab, a nozzle at the other of said ends of said arm via which said jet is formed, said means further including a barrel cam having a cylindrical surface and a tracking groove formed in said cylindrical surface, and a follower extending downwardly from said arm into said tracking groove, and means for preventing said edges from freezing together after said individual portions have been severed.

10. An apparatus for cutting a horizontal frozen food slab into a plurality of individual portions, a device for directing a liquid jet vertically downwardly onto the slab, and means for moving said device laterally relative to said slab to cut said slab into individual portions, said device including an arm having opposite ends, said arm being mounted for pivotal movement at one of said ends in a horizontal plane and a nozzle carried at the other of said ends directed downwardly for providing said vertical liquid jet, a cylindrical cam having formed thereon a tracking groove, and a cam follower on said arm located intermediate the ends of said arm, said cam follower projecting into said tracking groove.

11. Apparatus in accordance with claim 10 including a tube connected to said nozzle, and means on said arm for clamping a portion of said tube for movement with said arm.

* * * * *